(12) United States Patent
Capurso et al.

(10) Patent No.: US 10,853,795 B1
(45) Date of Patent: Dec. 1, 2020

(54) SECURE AUTHENTICATION BASED ON IDENTITY DATA STORED IN A CONTACTLESS CARD

(71) Applicant: Capital One Services, LLC, McLean, VA (US)

(72) Inventors: Nicholas Capurso, Tysons Corner, VA (US); Samuel Edwards, Richmond, VA (US); Jason Pribble, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/726,385

(22) Filed: Dec. 24, 2019

(51) Int. Cl.
*G06Q 20/38* (2012.01)
*G06Q 20/40* (2012.01)
*G06Q 20/34* (2012.01)

(52) U.S. Cl.
CPC ....... *G06Q 20/352* (2013.01); *G06Q 20/3829* (2013.01); *G06Q 20/4014* (2013.01)

(58) Field of Classification Search
CPC ............. G06Q 20/3829; G06Q 20/352; G06Q 20/4014
See application file for complete search history.

(56) References Cited

U.S. PATENT DOCUMENTS

| 4,683,553 | A | 7/1987 | Mollier |
| 4,827,113 | A | 5/1989 | Rikuna |
| 4,910,773 | A | 3/1990 | Hazard et al. |
| 5,036,461 | A | 7/1991 | Elliott et al. |
| 5,363,448 | A | 11/1994 | Koopman, Jr. et al. |

(Continued)

FOREIGN PATENT DOCUMENTS

| CA | 3010336 | A1 | 7/2017 |
| CN | 101192295 | A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Calvin L Hewitt, II
*Assistant Examiner* — Vincent Idiake

(57) ABSTRACT

Systems, methods, articles of manufacture, and computer-readable media for secure authentication based on identity data stored in a contactless card associated with an account. An application may receive an indication specifying to perform an operation. The application may receive encrypted data from the card, the encrypted data based on a cryptographic algorithm, a customer identifier, and a private key. The application may receive an indication that the authentication server verified the encrypted data based on the private key for the card. The application may determine a type of data required to authorize the operation. The application may receive data comprising passport data or driver license data from the card. The application may determine that the data satisfies a rule for authorizing the operation and authorize performance of the operation based on the authentication server verifying the encrypted data and the data satisfying the at least one rule.

17 Claims, 13 Drawing Sheets

(56) References Cited

U.S. PATENT DOCUMENTS

| | | |
|---|---|---|
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |

(56) References Cited

U.S. PATENT DOCUMENTS

| | | |
|---|---|---|
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0033688 A1* | 2/2005 | Peart .................. G06Q 20/20 705/39 |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |

(56) References Cited

U.S. PATENT DOCUMENTS

| | | |
|---|---|---|
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |

(56) References Cited

U.S. PATENT DOCUMENTS

| | | |
|---|---|---|
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0349889 A1* | 12/2018 | Ghosh .............. G06Q 20/387 |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0066063 A1* | 2/2019 | Jessamine .............. G06Q 20/322 |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 201715789 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version

(56) References Cited

OTHER PUBLICATIONS 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payrnents/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved, from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference Paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappaymen™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactiess Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

\* cited by examiner

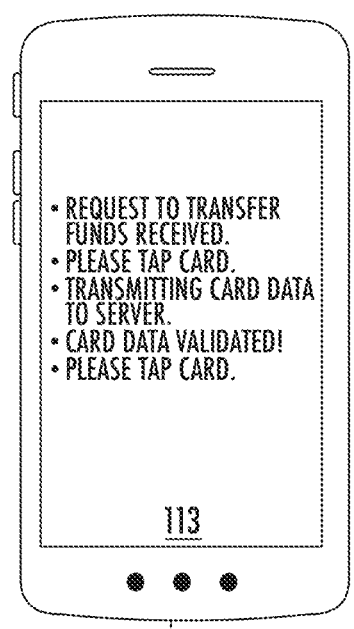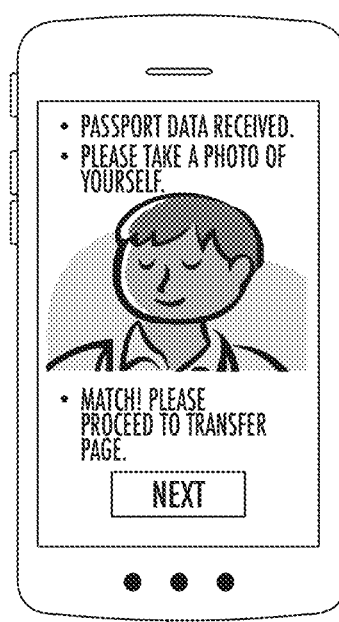
FIG. 2A
FIG. 2B

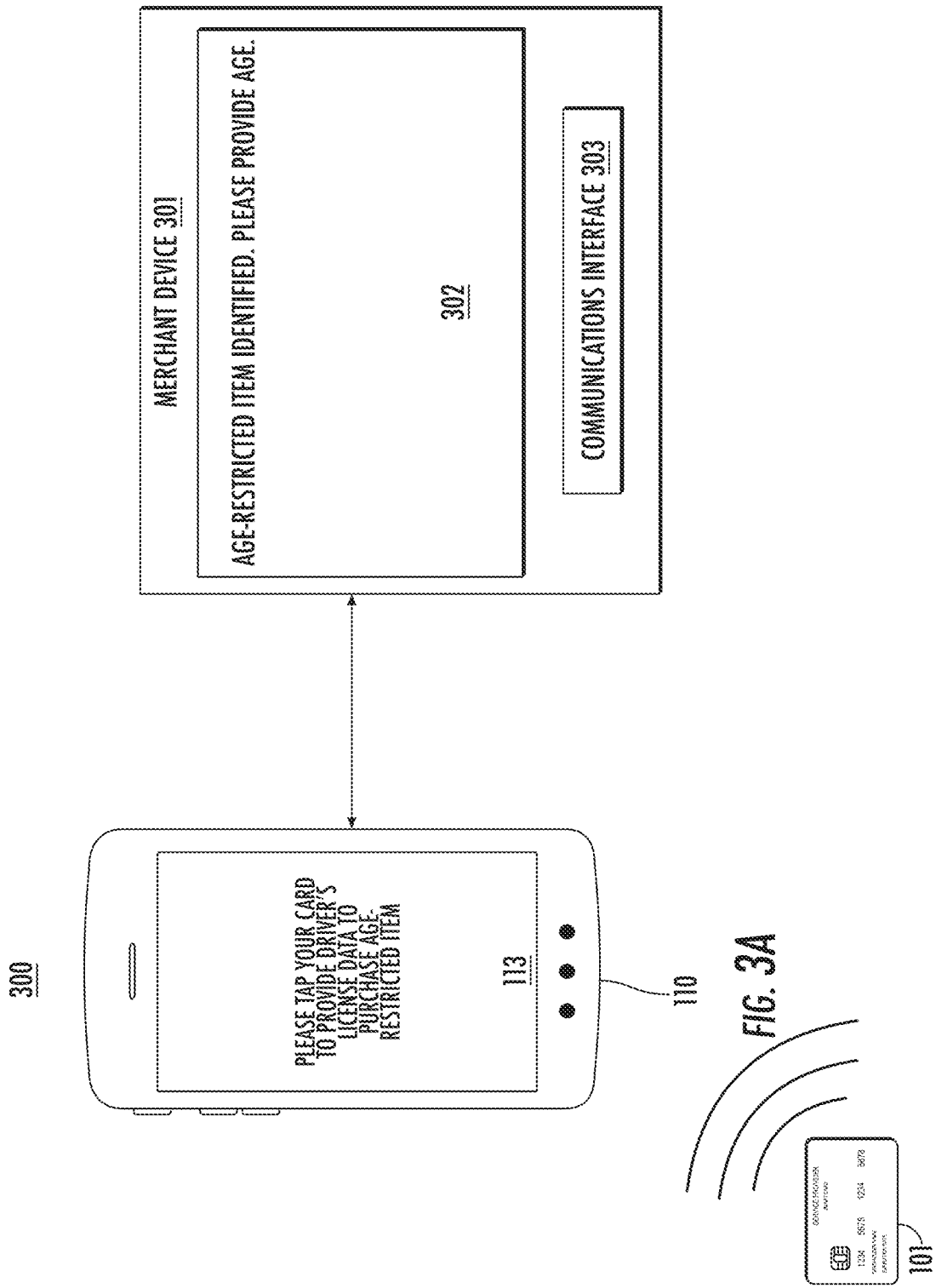

SECURE AUTHENTICATION BASED ON IDENTITY DATA STORED IN A CONTACTLESS CARD

TECHNICAL FIELD

Embodiments herein generally relate to computing platforms, and more specifically, to using a contactless card storing identity data for secure authentication.

BACKGROUND

Identity verification is an important task for modern computing systems. Conventional approaches may require that users provide additional information, such as a one-time passcode (OTP), when attempting to access computing systems or perform electronic transactions. However, security vulnerabilities may exist in these solutions. For example, the OTP may be intercepted and used to gain unauthorized access. Furthermore, different systems may require different types of additional information for identity verification, making conventional solutions impractical for many users.

SUMMARY

Embodiments disclosed herein provide systems, methods, articles of manufacture, and computer-readable media for secure authentication based on identity data stored in a contactless card. In one example, an application may receive an indication specifying to perform an operation associated with an account. The application may receive encrypted data from a contactless card associated with the account, the encrypted data based on a cryptographic algorithm, a customer identifier, and a private key for the contactless card. The application may receive, from an authentication server, an indication specifying that the authentication server verified the encrypted data based on the private key for the contactless card. The application may determine a type of authentication data required to authorize the operation. The application may receive, based on the determined type of authentication data, a first data element from the contactless card, the first data element comprising passport data or driver license data. The application may determine that the first data element satisfies at least one rule for authorizing the operation. The application may authorize performance of the operation based on the received indication specifying that the authentication server verified the encrypted data and the determination that the first data element satisfies the at least one rule for authorizing the operation.

BRIEF DESCRIPTION OF THE DRAWINGS

FIGS. 2A-2C illustrate embodiments of tapping a contactless card to a computing device to provide secure authentication based on identity data stored in the contactless card.

FIGS. 3A-3C illustrate embodiments of tapping a contactless card to a computing device to provide secure authentication based on identity data stored in the contactless card.

DETAILED DESCRIPTION

Figure 1A:
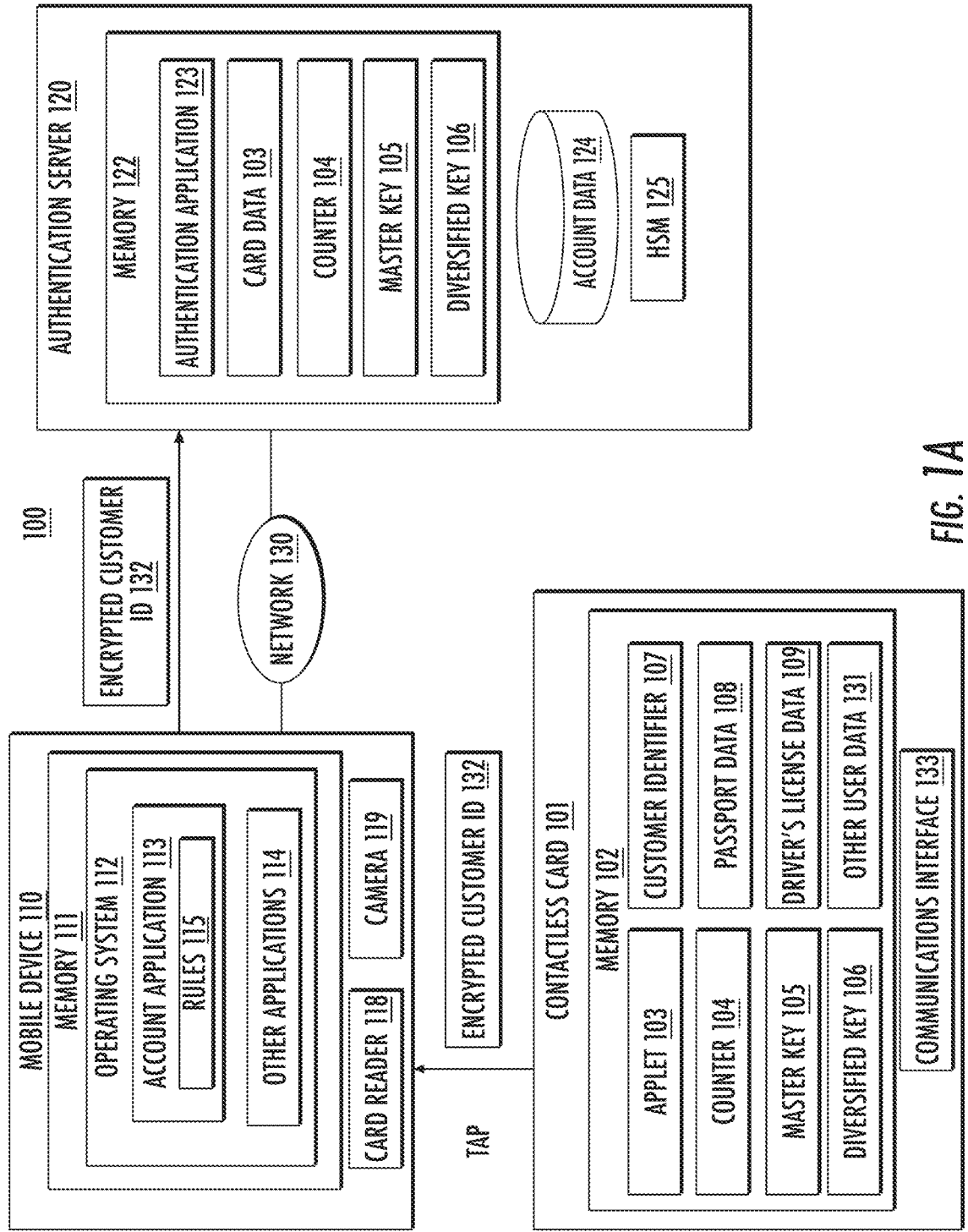
FIGS. 1A-1B illustrate embodiments of a system for secure authentication based on identity data stored in a contactless card.

Embodiments disclosed herein provide techniques for secure authentication using identity data stored in a contactless card. Generally, a contactless card may store a plurality of different types of information for a user, such as driver's license information, passport information, social security number, and/or any other biographical information. The user may then attempt to perform an operation, such as making a purchase, transferring funds via an application executing on a mobile device, requesting a credit increase via the application, and the like. The application may determine a type of authentication data required to authorize the requested operation. For example, a rule may specify that transferring funds via the application requires authentication based on passport data stored in the contactless card. Therefore, the application may determine that passport data as the type of authentication data.

The user may then tap the contactless card to the mobile device to initiate the secure authentication process. Once tapped, the contactless card may generate and transmit encrypted data to the application. The encrypted data may be generated based on a cryptographic algorithm, a customer identifier, and an encryption key for the contactless card. The application may then transmit the encrypted data to an authentication server for authentication. The server may then decrypt the encrypted data using a local copy of the encryption key for the contactless card to yield the customer identifier, thereby authenticating the encrypted data. The server may then transmit an indication of the authentication of the encrypted data to the application.

The application may then process the passport data. In some embodiments, the passport data is sent by the contactless card to the application with the encrypted customer identifier. In other embodiments, the passport data is sent by the contactless card subsequent to another tap of the contactless card to the mobile device. To process the passport data, the application may perform any number of operations. For example, the passport data stored on the contactless card may include a passport image depicting the user. In such an example, the application may instruct the user to capture an image depicting their face using the mobile device. Once captured, the application may compare the images to determine a similarity between the images. If the similarity exceeds a threshold level of similarity specified in a rule, the application may authenticate the user and/or validate the identity of the user. The application may then authorize the performance of the operation based on the received indication specifying that the authentication server verified the encrypted data and the determination that the similarity of the images exceeds the threshold level of similarity. For example, the user may be permitted to access an interface of the application to transfer funds from one account to another.

Advantageously, embodiments disclosed herein improve the security of all devices and associated data. For example, by requiring validation of encrypted data generated by the contactless card to access applications and/or data, the security of the applications and/or data are improved. As another example, by requiring validation of the encrypted data prior to performing operations (e.g., making purchases, extending credit, etc.), the security of such operations and associated assets is improved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile computing devices 110, and an authentication server 120. The contactless cards 101 are representative of any type of payment cards, such as a credit card, debit card, ATM card, gift card, and the like. The contactless cards 101 may comprise one or more communications interfaces 133, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The authentication server 120 is representative of any type of computing device, such as a server, workstation, compute cluster, cloud computing platform, virtualized computing system, and the like.

As shown, a memory 102 of the contactless card includes an applet 103, a counter 104, a master key 105, a diversified key 106, a unique customer identifier (ID) 107, passport data 108, driver's license data 109, and other user data 131. The applet 103 is executable code configured to perform the operations described herein. The counter 104, master key 105, diversified key 106, and customer ID 107 are used to provide security in the system 100 as described in greater detail below. The passport data 108 is representative of an electronic passport of a user associated with the contactless card 101. The passport data 108 may include any number and types of data. For example, the passport data 108 may include text data describing different attributes of the passport and/or user (e.g., name, date of birth, passport number, passport issue date, passport expiration date, issuing nation, etc.) as well as image data (e.g., one or more images of the passport itself, an image of the user included in the passport, etc.). The customer ID 107, passport data 108, driver's license data 109, and other user data 131 may collectively be referred to herein as "identity data."

The driver's license data 109 is representative of one or more driver's licenses held by the user associated with the contactless card. As with the passport data 108, the driver's license data 109 may include any number and types of data. For example, the driver's license data 109 may include a barcode (or other computer-readable marker) that encodes different attributes of the driver's license and/or user (e.g., name, date of birth, license number, license issue date, expiration date, issuing state, etc.), text data representing the attributes (and/or the barcode), and/or image data (e.g., one or more images of the driver's license, an image of the user included in the driver's license, etc.). The other user data 131 is representative of other data describing the user. For example, the other user data 131 may include social security numbers, images, data representing biometric identifiers of the user, other identification cards, loyalty program information, and the like. In some embodiments, the passport data 108, driver's license data 109, and other user data 131 are encrypted.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an account application 113. The account application 113 allows users to perform various account-related operations, such as viewing account balances, purchasing items, processing payments, and the like. The account application 113 may further control access permissions to different functions provided by the account application 113 and/or the other applications 114. Generally, a user may authenticate using authentication credentials to access certain features of the account application 113. For example, the authentication credentials may include a username (or login) and password, biometric credentials (e.g., fingerprints, Face ID, etc.), and the like.

According to various embodiments, the user may request and/or attempt to perform an operation. The operation may include any type of operation, such as using the contactless card 101 to make a purchase, accessing certain features of the account application 113, performing various account-related operations using the account application 113, and/or accessing the other applications 114 (or any feature thereof). The other applications 114 are representative of any type of computing application, such as web browsers, messaging applications, word processing applications, social media applications, and the like. For example, the user may desire to transfer funds from their account to another account using the account application 113. The use of a specific operation as a reference example herein is not limiting of the disclosure, as the disclosure is equally applicable to any other type of operation.

To authorize the requested operation, (e.g., the previous example of transferring funds), the system 100 must authenticate and/or verify the identity of the user. To authenticate the identity of the user, embodiments disclosed herein may leverage the contactless card 101. More specifically, once the user requests to perform the operation (or otherwise access a restricted resource), the account application 113 may output a notification instructing the user to tap the contactless card 101 to the device 110. Generally, once the contactless card 101 is brought within communications range of the communications interface 118 of the device 110, the applet 103 of the contactless card 101 may generate encrypted data, e.g., an encrypted customer ID 132 as part of the authentication process required to authorize the requested operation. To enable NFC data transfer between the contactless card 101 and the mobile device 110, the account application 113 may communicate with the contactless card 101 when the contactless card 101 is sufficiently close to the communications interface 118 of the mobile device 110. The communications interface 118 may be configured to read from and/or communicate with the communications interface 133 of the contactless card 101 (e.g., via NFC, Bluetooth, RFID, etc.). Therefore, example communications interfaces 118 include NFC communication modules, Bluetooth communication modules, and/or RFID communication modules.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key may be kept secret from all parties other than the contactless card 101 and server 120, thereby enhancing security of the system 100. In some embodiments, the applet 103 of the contactless card 101 may encrypt and/or decrypt data (e.g., the customer ID 107, passport data 108, driver's license data 109, and/or other user data 131) using the master key 105 and the data as input a cryptographic algorithm. For example, encrypting the customer ID 107 with the master key 105 may result in the encrypted customer ID 132. Similarly, the authentication server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). When preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data, such as the passport data 108, driver's license data 109, and/or other user data 131) using the diversified key 106 and the data as input to the cryptographic algorithm. For example, encrypting the customer ID 107 with the diversified key 106 may result in the encrypted customer ID 132.

Regardless of the encryption technique used, the contactless card 101 may then transmit the encrypted data (e.g., the encrypted customer ID 132) to the account application 113 of the mobile device 110 (e.g., via an NFC connection, Bluetooth connection, etc.). The account application 113 of the mobile device 110 may then transmit the encrypted customer ID 132 to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Once received, the authentication application 123 may authenticate the encrypted customer ID 132. For example, the authentication application 123 may attempt to decrypt the encrypted customer ID 132 using a copy of the master key 105 stored in the memory 122 of the authentication server 120. In another example, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the encrypted customer ID 132.

Regardless of the decryption technique used, the authentication application 123 may successfully decrypt the encrypted customer ID 132, thereby verifying the encrypted customer ID 132 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the encrypted customer ID 132 using the keys 105 and/or 106 and a cryptographic function. Similarly, the secure element and/or HSM 125 may generate the diversified key 106 based on the master key 105 and counter value 104 as described above.

If, however, the authentication application 123 is unable to decrypt the encrypted customer ID 132 to yield the expected result (e.g., the customer ID 107 of the account associated with the contactless card 101), the authentication application 123 does not validate the encrypted customer ID 132. In such an example, the authentication application 123 transmits an indication of the failed verification to the account application 113. As such, the account application 113 may reject performance of the requested operation to preserve the security of the account.

Figure 1B:
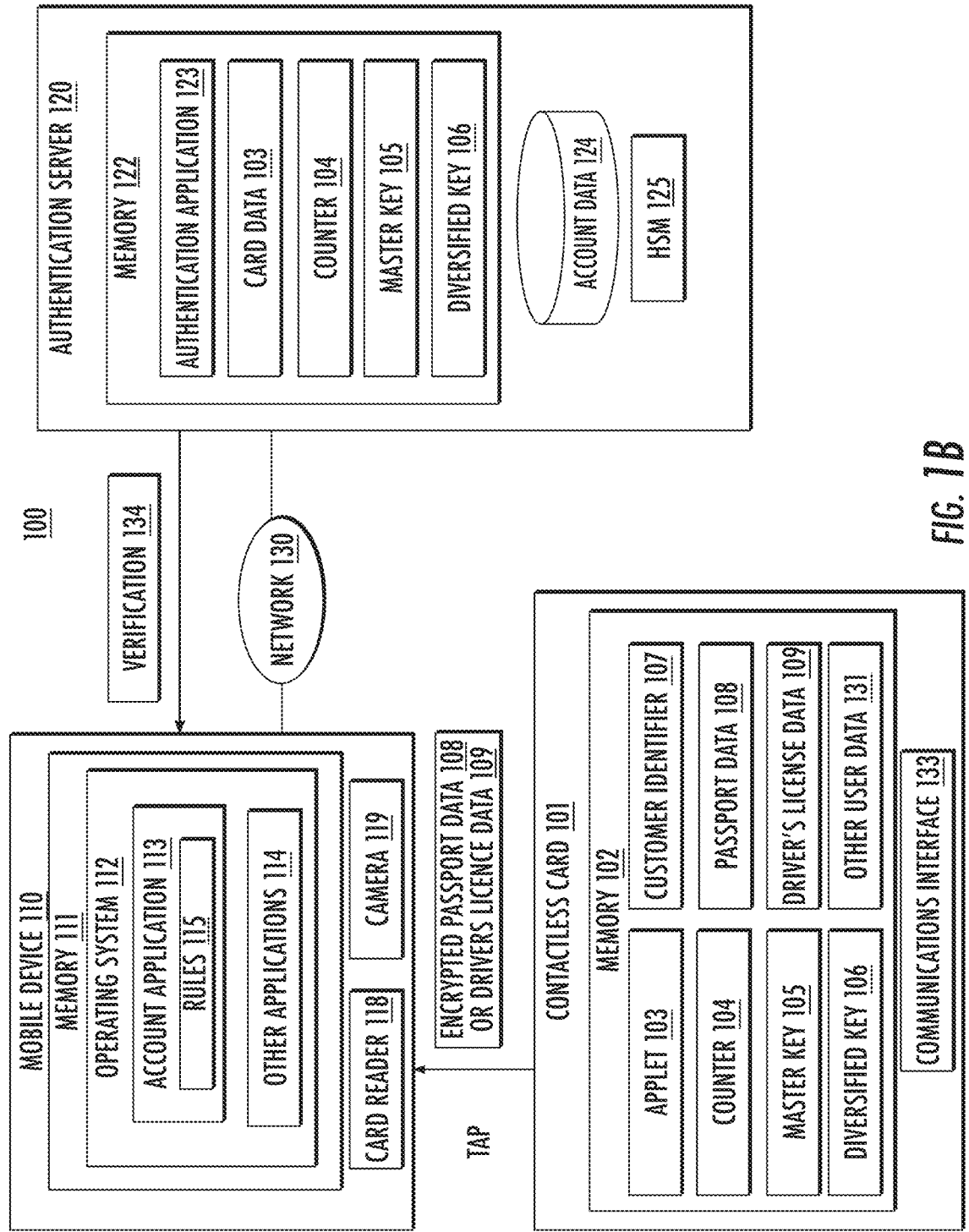

FIG. 1B illustrates an embodiment where the authentication application 123 has decrypted the encrypted customer ID 132, thereby verifying (or authenticating) the encrypted data. As shown, the authentication application 123 transmits a verification 134 to the mobile device 110, where the verification 134 indicates that the authentication application 123 successfully decrypted the encrypted customer ID 132. Responsive to receiving the verification 134, the account application 113 may reference the rules 115 to determine what, if any, additional authentication steps are required. The rules 115 may generally specify a plurality of different authentication rules and/or thresholds for different requested operations. The rules may be based on the type of requested operation. For example, for the transfer of funds, the rules 115 may require additional authentication based on additional data elements such as the passport data 108 and/or the driver's license data 109.

In the example where additional authentication is based on the passport data 108, the account application 113 may output an indication specifying that the user tap the contactless card 101 to the mobile device 110. The account application 113 may then instruct the contactless card 101 to transmit the passport data 108. In response, the contactless card 101 may transmit the passport data 108 to the account application 113. In some embodiments, the passport data 108 may be encrypted. In such embodiments, the account application 113 may transmit the encrypted passport data 108 to the server 120 for decryption (e.g., based on the keys 105 and/or 106), which then sends the decrypted passport data 108 to the account application 113. In another embodiment, the user may provide input to the account application 113 used to decrypt the encrypted passport data 108.

Furthermore, the account application 113 may instruct the user to capture an image depicting themselves using the camera 119. The account application 113 may then compare the captured image to a passport image in the passport data 108 to determine a similarity of the persons depicted in each image. If the account application 113 determines that the similarity of the persons depicted in the images exceeds a threshold similarity specified in the rules 115, the account application 113 may authorize the requested operation. The user may then proceed to complete the transfer of funds using the account application 113.

As stated, in another example, the rules 115 may require authentication based on the driver's license data 109. The account application 113 may then output an indication specifying that the user tap the contactless card 101 to the mobile device 110. The account application 113 may then instruct the contactless card 101 to transmit the driver's license data 109. In response, the contactless card 101 may transmit the driver's license data 109 to the account application 113. In some embodiments, the driver's license data 109 may be encrypted. Otherwise, the account application 113 may restrict performance of the operation (e.g., by restricting access to the graphical user interface (GUI) of the account application 113 used to transfer funds). In such embodiments, the account application 113 may transmit the encrypted driver's license data 109 to the server 120 for decryption, which then sends the decrypted driver's license data 109 to the account application 113.

As with the passport-based authentication, the account application 113 then may instruct the user to capture an image depicting themselves using the camera 119. The account application 113 may then compare the captured image to a driver's license image in the driver's license data 109 to determine a similarity of the persons depicted in each image. If the account application 113 determines that the similarity of the persons depicted in the images exceeds a threshold similarity specified in the rules 115, the account application 113 may authorize the requested operation. Otherwise, the account application 113 may restrict performance of the operation (e.g., by restricting access to the GUI of the account application 113 used to transfer funds). The user may then proceed to complete the transfer of funds using the account application 113.

Although image-based authentication is used as an example, other data elements may be used to authorize the requested operation. For example, the account application 113 may determine whether the name on the passport and/or driver's license matches a name on the account associated with the contactless card 101. As another example, the account application 113 may determine whether data encoded in the driver's license data 109 is readable. As yet another example, the account application 113 may determine whether a date of birth in passport and/or driver's license matches known a date of birth, e.g., a date of birth specified in the account data 124 for the account associated with the contactless card 101. In another example, a social security number stored in the other user data 131 may be compared to a known social security number of the user associated with the account. If a matching name and/or social security number is found, the account application 113 may authorize the attempted operation. Otherwise, the account application 113 may reject the attempted operation.

In at least one embodiment, the applet 103 of the contactless card 101 may generate a digital signature (not pictured) for the passport data 108 and/or the driver's license data 109 using the keys 105 and/or 106. A respective digital signature may sign the passport data 108 and/or driver's license data 109. The contactless card 101 may then transmit the digital signatures with the passport data 108 and/or driver's license data 109 to the account application 113, which in turn transmits the digital signatures to the authentication server 120. The authentication application 123 may also verify the digital signature by decrypting the digital signature using a public key associated with the contactless card 101 and stored by the server 120. If the digital signature is verified, the authentication application 123 may transmit an indication of the successful verification to the account application 113, which may permit performance of the operation based on verification of the digital signature. If the digital signature is not verified, the account application 113 may restrict performance of the operation.

Although depicted in FIGS. 1A-1B as occurring in separate tap operations, in some embodiments, the passport data 108 and/or the driver's license data 109 may be transmitted with the encrypted customer ID 132 responsive to a single tap of the contactless card 101 to the mobile device 110.

Furthermore, in some embodiments, the user may obtain new and/or updated identification information, such as a passport, driver's license, etc. In such embodiments, the account application 113 may receive the new and/or updated versions of the passport data 108, driver's license data 109, and/or other user data 131, e.g., from the authentication server 120. In such embodiments, the account application 113 may transmit the data received from the server 120 to the contactless card 101, and the applet 103 may store the received data in the memory 102.

Figure 2C:
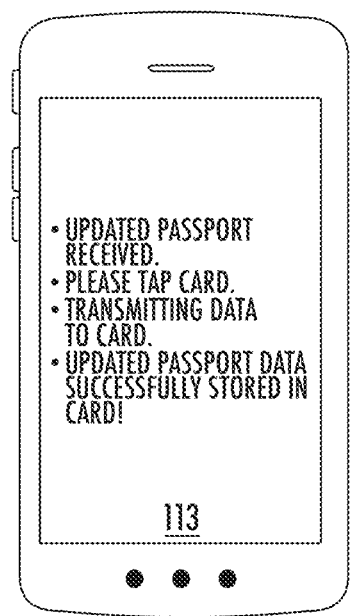
Figure 2C:
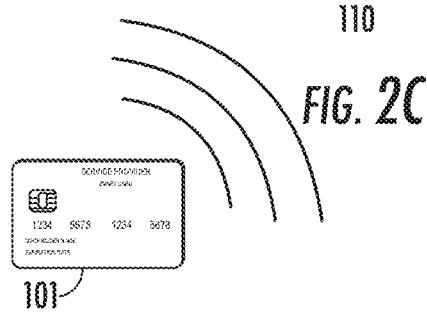

FIG. 2A is a schematic 200 depicting an example embodiment of tapping the contactless card 101 to provide secure authentication based on identity data stored in the contactless card 101. As shown, the account application 113 may receive a request to perform an operation. Continuing with the previous example, the request may be to transfer funds from one account to another account. In response, the account application 113 may output an indication to tap the contactless card 101 to the device 110. Once the user taps the contactless card 101 to the mobile device 110, the applet 103 of the contactless card 101 generates the encrypted customer ID 132. The applet 103 may then transmit the encrypted customer ID 132 to the mobile device 110, e.g., via NFC. Once received, the account application 113 may transmit the encrypted customer ID 132 to the authentication application 123.

The authentication application 123 may then attempt to decrypt the encrypted customer ID 132 using the master key 105 and/or the diversified key 106 associated with the contactless card 101. If the authentication application 123 is unable to decrypt the encrypted customer ID 132 to yield an expected result (e.g., the customer ID 107 of the account, etc.), the authentication application 123 does not verify the encrypted customer ID 132 and informs the account application 113 of the failed verification. The account application 113 may then reject the request to initiate the transfer of funds. If the authentication application 123 successfully decrypts the encrypted customer ID 132 to yield an expected result (e.g., the customer ID 107 of the account, etc.), the authentication application 123 verifies the encrypted customer ID 132 and transmits an indication of the verification of the encrypted customer ID 132 to the account application 113.

Responsive to receiving the verification from the authentication application 123, the account application 113 may reference the rules 115 to determine which type of data is required to authorize the requested transfer of funds. For example, the rules 115 may specify that fund transfers require verification of the encrypted customer ID 132 and verification based on the passport data 108. In at least one embodiment, the type of data specified by the rules 115 is based on the type of requested operation (e.g., the transfer of funds). Generally, the rules 115 may specify different levels of security for different types of transaction (e.g., requiring verification of passport data 108 for higher risk operations, while not requiring verification of the passport data 108 for lower risk operations).

The account application 113 may output another indication to tap the contactless card 101 to the device 110. The account application 113 may instruct the contactless card 101 to transmit the passport data 108. The applet 103 may then transmit the passport data 108 to the mobile device 110, e.g., via NFC.

As shown in the schematic 210 of FIG. 2B, the account application 113 may then output an indication instructing the user to capture an image depicting their face. The user may then capture an image depicting their face using the camera 119. The account application 113 may then compare the captured image to a passport image in the passport data 108 to determine a similarity of the persons depicted in each image. If the account application 113 determines that the similarity of the persons depicted in the images exceeds a threshold similarity specified in the rules 115, the account application 113 may authorize the requested fund transfer operation. Otherwise, the account application 113 may reject the requested fund transfer operation and restrict access to the GUI of the account application 113 to perform fund transfers. In the example depicted in FIG. 2B, the similarity exceeds the threshold, and the account application 113 permits performance of the requested transfer. The user may then proceed to complete the transfer of funds using a corresponding GUI of the account application 113.

FIG. 3A is a schematic 300 illustrating an example embodiment of tapping the contactless card 101 to provide secure authentication based on identity data stored in the contactless card 101. As stated, the contactless card 101 may be used as a form of payment for a purchase and the system 100 may use identity data stored in the contactless card to provide secure authentication when processing the payment. While an in-person transaction is depicted as a reference example, the disclosure is equally applicable to online transactions.

As shown, a merchant device 301 display 302 outputs an indication specifying that an age-restricted item has been identified as part of the requested purchase and the age of the customer must be provided to complete the requested purchase. The merchant device 301 is representative of any type of device that can process payments, such as card reader devices, smartphones, tablet computers, desktop computers, point of sale (POS) terminals, servers, workstations, laptop computers, and the like. The merchant device 301 includes a communications interface 303 configured to communicate via one or more of NFC, Bluetooth, RFID, and/or Wi-Fi. Therefore, the merchant device 301 may communicate with the contactless card 101 and/or the mobile device 110. In some embodiments, the communications interface 118 of the mobile device 110 operates in NFC card-emulation mode to emulate the contactless card 101 and pay for a transaction via the merchant device 301.

Therefore, the account application 113 may receive an indication from the merchant device 301 specifying that verification of the customer's age is needed. The account application 113 may then output an indication specifying to tap the contactless card 101 to the device 110. Once the customer taps the contactless card 101 to the mobile device 110, the applet 103 of the contactless card 101 generates the encrypted customer ID 132. The applet 103 may then transmit the encrypted customer ID 132 to the mobile device 110, e.g., via NFC. In the embodiment depicted in FIGS. 3A-3C, the contactless card 101 also encrypts and transmits the driver's license data 109 to the mobile device 110 with the encrypted customer ID 132. Once received, the account application 113 may transmit the encrypted customer ID 132 and the driver's license data to the authentication application 123. The authentication application 123 may then decrypt the encrypted customer ID 132, thereby verifying the encrypted customer ID 132. The authentication application 123 may further decrypt the driver's license data 109.

Figure 3B:
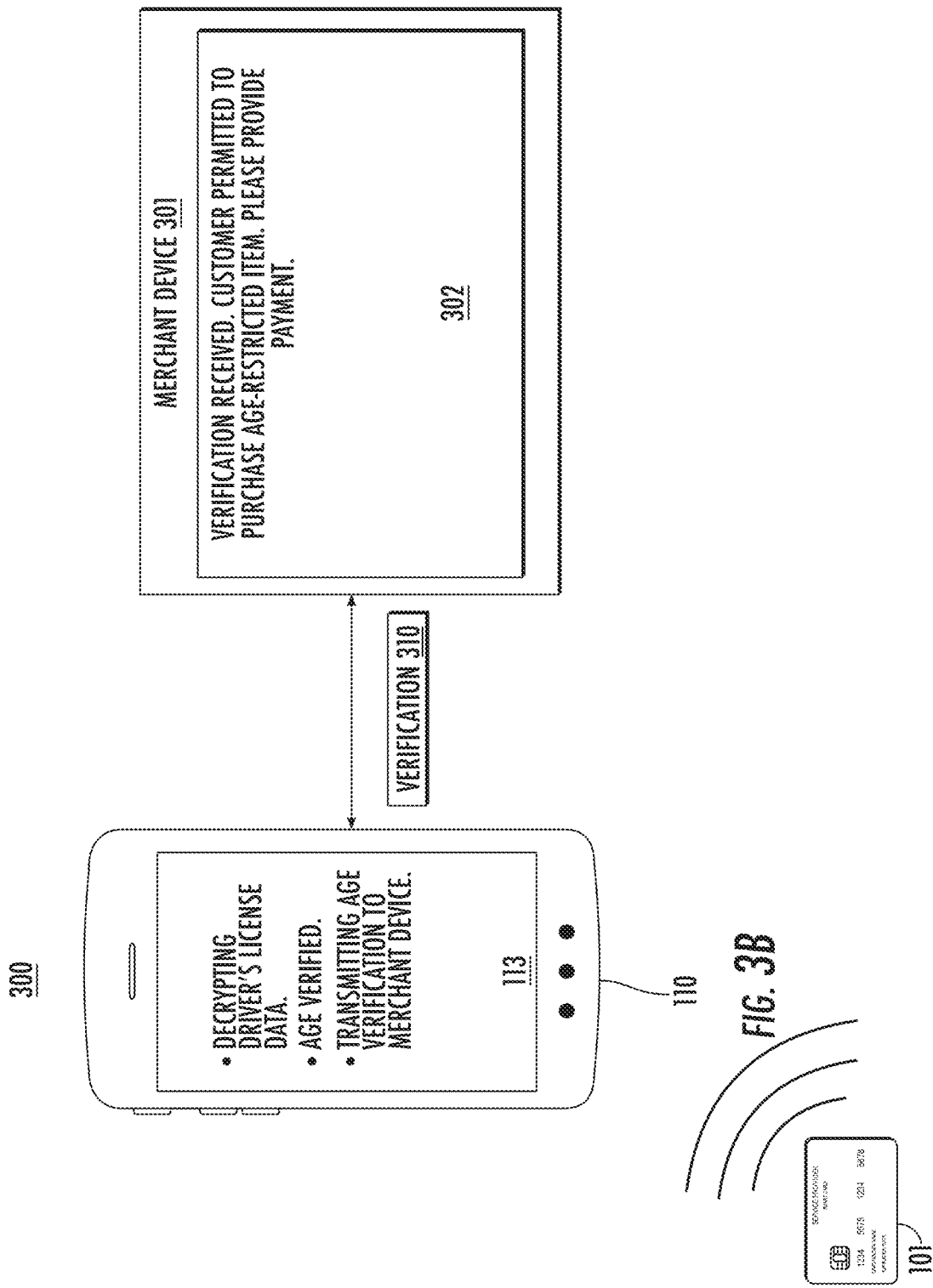

FIG. 3B illustrates an embodiment where the account application 113 receives an indication from the authentication application 123 that the encrypted customer ID 132 was validated. The account application 113 may further receive the decrypted driver's license data 109 from the authentication application 123. The account application 113 (and/or the authentication application 123) may read the driver's license data 109 to determine the customer's age (e.g., based on a difference between a current date and a date of birth specified in the driver's license data 109). If the determined age exceeds the minimum age for purchasing the age-restricted item, the account application 113 transmits an indication of verification 310 to the merchant device 301. In some embodiments, the account application 113 transmits the relevant driver's license data 109 (e.g., date of birth) to the merchant device 301. Doing so allows the merchant device 301 to independently verify that the customer is of the requisite age to purchase the age-restricted item.

Figure 3C:
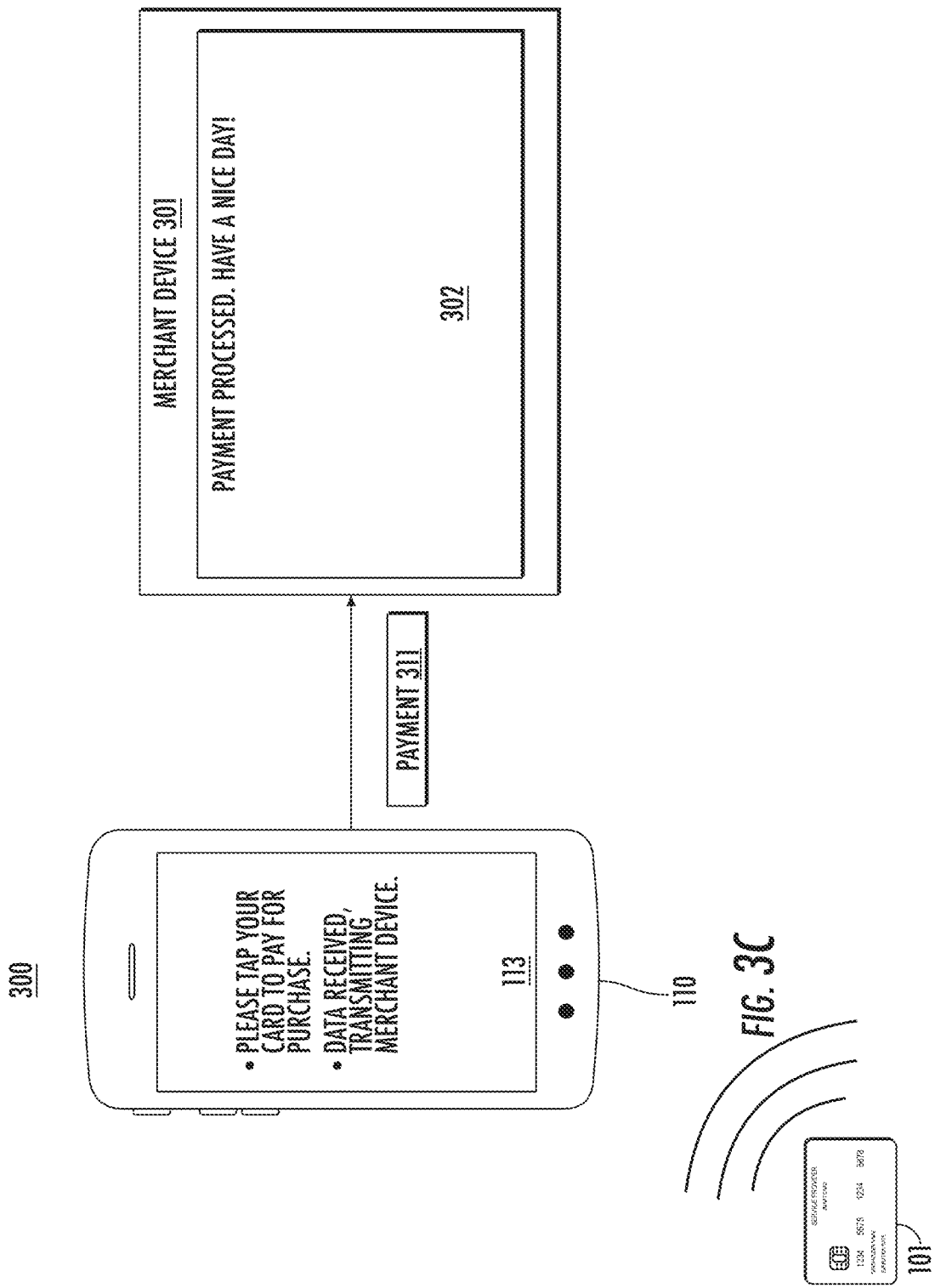

FIG. 3C illustrates an embodiment where the account application 113 instructs the user to tap the contactless card 101 to the mobile device 110 to complete the payment for the purchase based on the verification of the encrypted customer ID 132 by the authentication application 123 and the verification of the customer's age. The communications interface 118 of the mobile device 110, acting in NFC card-emulation mode, may cause the applet 103 of the contactless card 101 to transmit payment information (e.g., a card number, expiration date, and/or card verification value (CVV)) to the account application 113. In some embodiments, the payment information includes an encrypted customer ID 132, which is transmitted by the account application 113 to the server 120 for verification. Once verified, the account application 113 transmits the received payment information to the merchant device 301 as payment data 311. The merchant device 301 may then process the transaction using the received payment data 311.

Figure 4A:
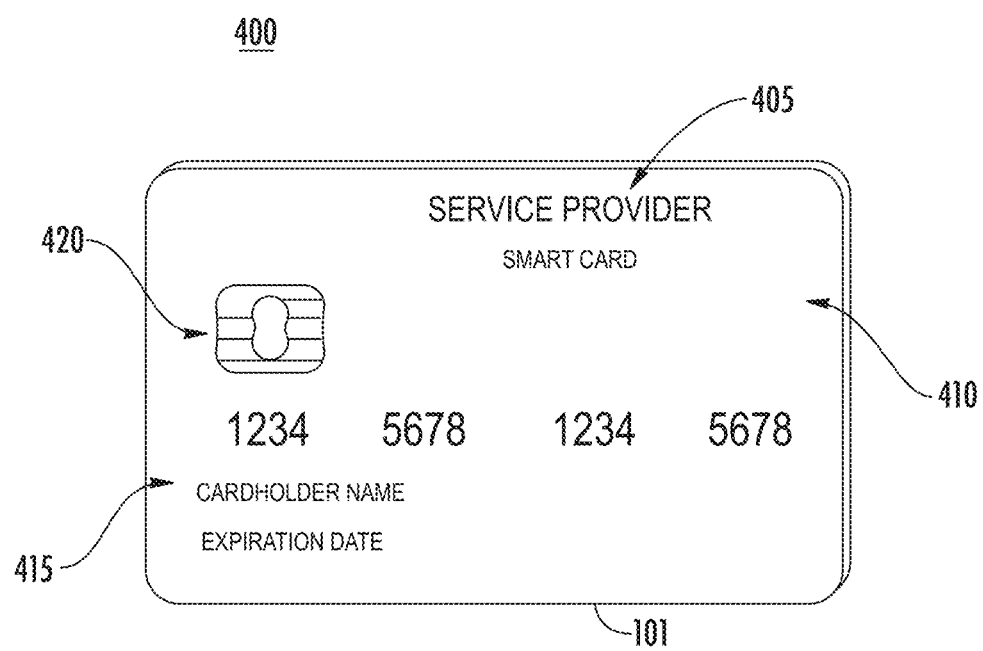
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 40, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
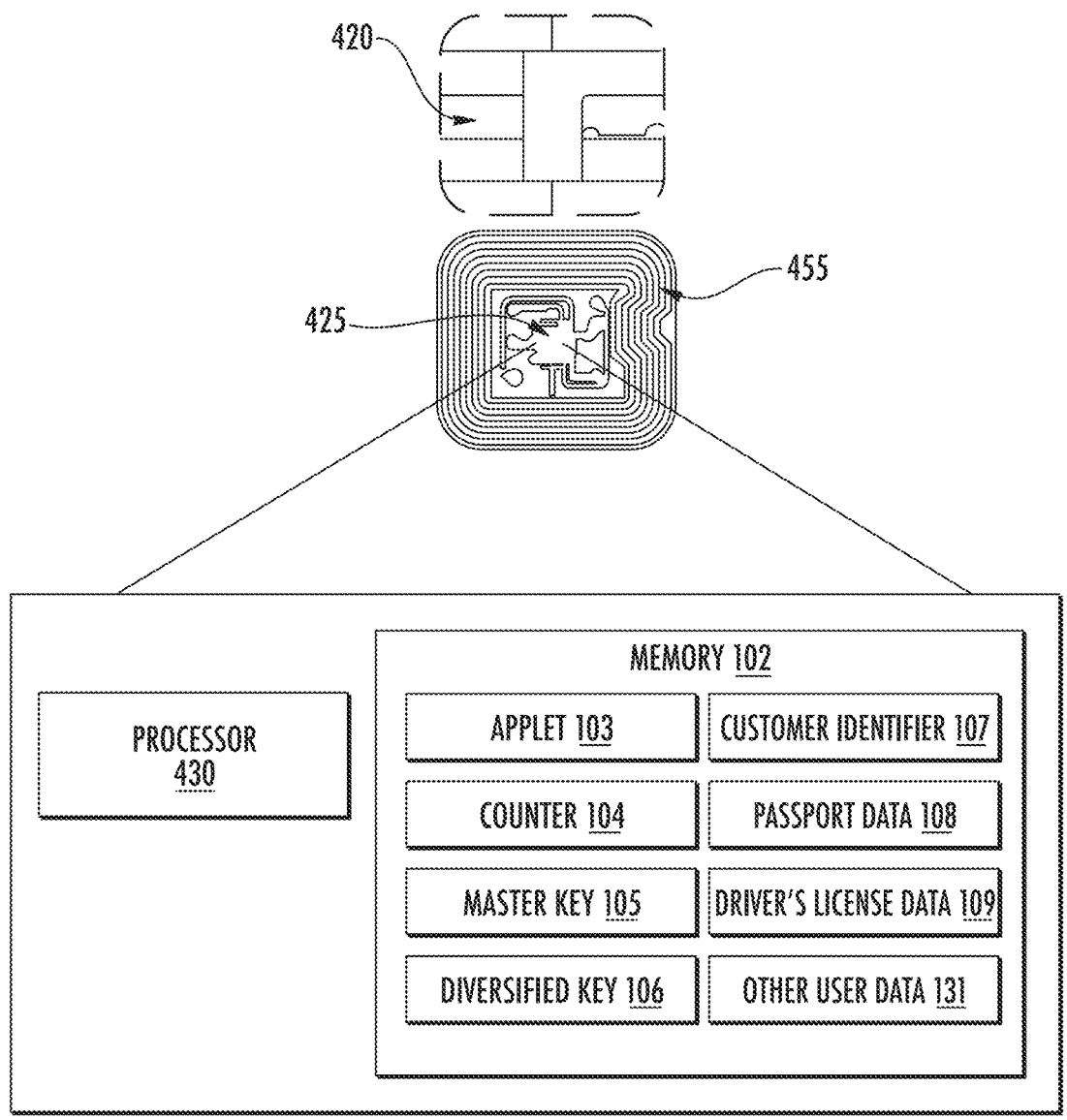

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to store one or more applets 103, the counter 104, master key 105, the diversified key 106, one or more customer (or user) IDs 107, the passport data 108, the driver's license data 109, and the other user data 131. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the keys 105 and/or 106 to generate the encrypted customer ID 132.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In some examples, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 118 of the device 110), and produce an NDEF message that comprises a cryptographically secure OTP encoded as an NDEF text tag.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
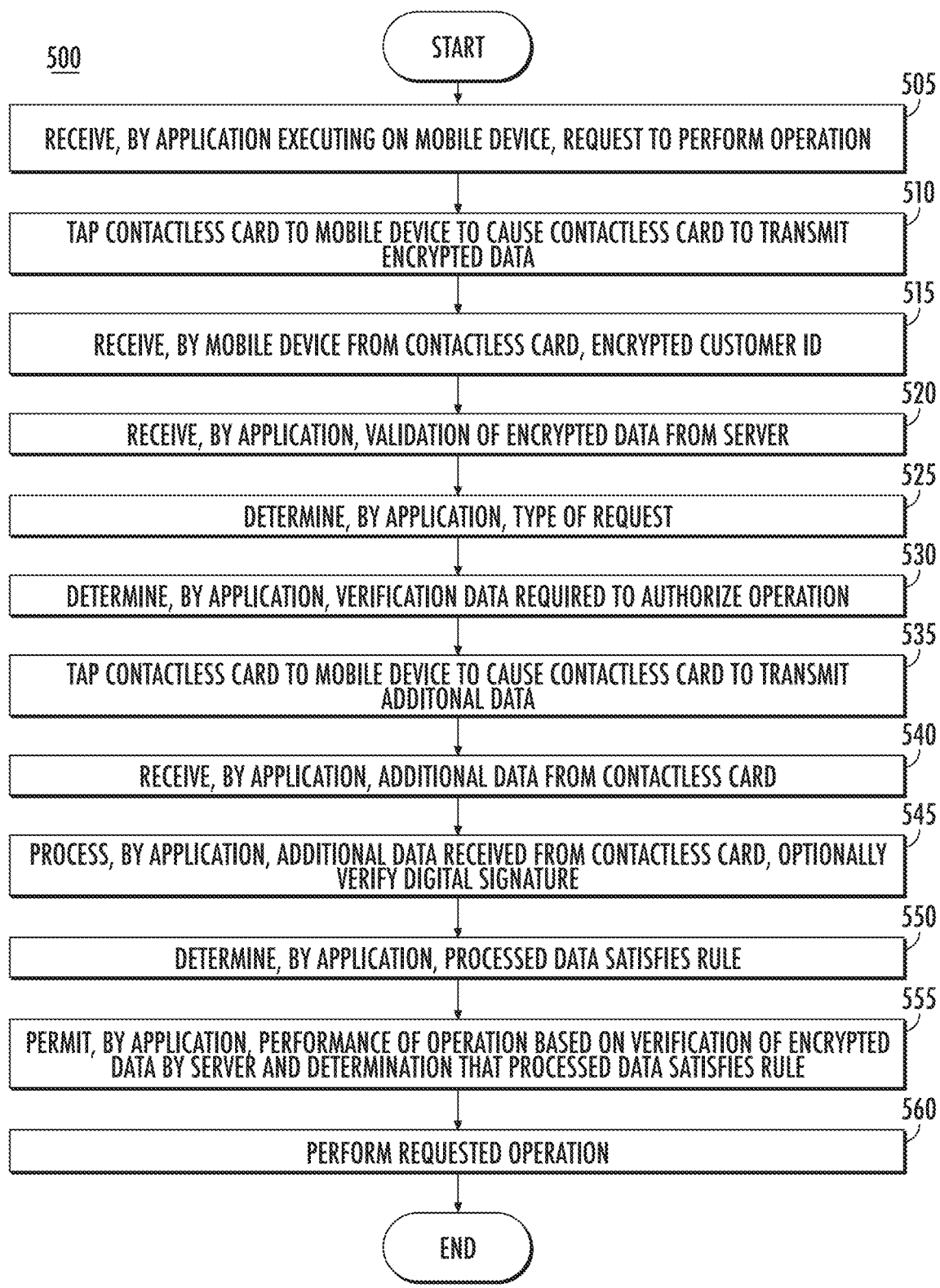
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to use the contactless card 101 to provide secure authentication based on identity data stored in the contactless card 101. Embodiments are not limited in this context.

As shown, the logic flow 500 begins at block 505, where the account application 113 receives a request to perform an operation. As stated, the requested operation may be received based on input from a user of the account application 113, an external source (e.g., the merchant device 301), one of the other applications 114, or any other source. The request may be related to, for example and without limitation, use of the account application 113, use of the other applications 114, operations related to the account associated with the contactless card 101, and/or a transaction. More generally, the request may be received subsequent to a user providing authentication credentials required to access the account in the account application 113. At block 510, a user taps the contactless card 101 to the mobile device 110 to cause the applet 103 of the contactless card 101 to generate and transmit the encrypted customer ID 132 to the mobile device 110.

At block 515, the account application 113 may receive the encrypted customer ID 132 from the contactless card 101. The account application 113 may then transmit the encrypted customer ID 132 received from the contactless card 101 to the authentication server 120. The server 120 may attempt to decrypt the encrypted customer ID 132 as described herein. At block 520, the account application 113 receives an indication from the server 120 that the encrypted customer ID 132 was verified by decrypting the encrypted customer ID 132.

At block 525, the account application 113 determines a type of the request. At block 530, the account application 113 determines a type of verification data specified in the rules 115 required to authorize the type of operation. For example, the passport data 108 may be specified as the verification data required by the rules 115. At block 530, the user taps the contactless card 101 to the mobile device 110. Doing so instructs the applet 103 of the contactless card 101 to transmit the passport data 108 to the mobile device 110. The account application 113 may receive the additional data (e.g., the passport data 108) from the contactless card 101 at block 535.

At block 540, the account application 113 may receive the additional data from the contactless card 101. At block 545, the account application 113 may process the data received at block 540. For example, the account application 113 may perform any age-verification, account verification, and/or identify verification specified by the rules 115. As another example, the account application 113 and/or the authentication server 120 may verify a digital signature of the received data. At block 550, the account application 113 determines that the processed data satisfies the rules 115. At block 555, the account application 113 permits performance of the requested operation based on the verification of the encrypted customer ID 132 by the server 120 and the determination that the processed data received at block 535 satisfies the rules 115. At block 560, the requested operation may be performed, e.g., by the user and/or by the account application 113.

Figure 6:
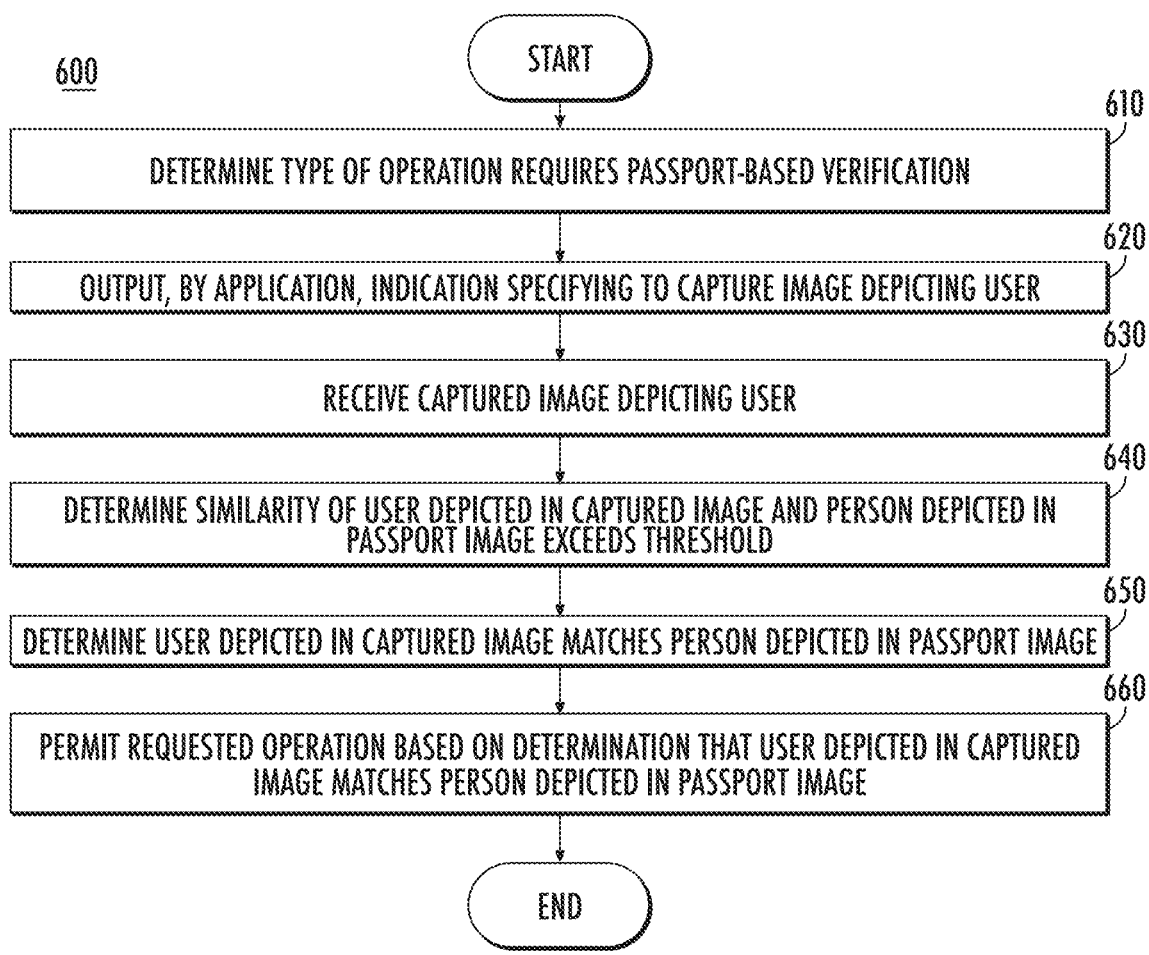
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to provide authentication based on the passport data 108 stored in the contactless card 101. Embodiments are not limited in this context.

As shown, the logic flow 600 begins at block 610, where the account application 113 determines that the rules 115 require passport-based verification based on the type of the requested operation. At block 620, the account application 113 outputs an instruction to the user to capture an image depicting at least the face of the user. At block 630, the account application 113 receives the image captured by the camera 119 of the mobile device 110. At block 640, the account application 113 compares the captured image received at block 630 to one or more images associated with the passport in the passport data 108 and determines that a similarity of the persons depicted in each image exceeds a threshold level of similarity specified by the rules 115. At block 650, the account application 113 determines, based on the determination at block 640, that the user depicted in the captured image matches the person depicted in the passport image of the passport data 108. At block 660, the account application 113 permits performance of the requested operation based at least in part on the determinations that the user depicted in the captured image matches the person depicted in the passport image of the passport data 108 and/or that the determined similarity exceeds the threshold specified by the rules 115.

Although the logic flow 600 relates to an image in the passport data 108, the logic flow 600 is equally applicable to image-based verification using an image of the user in the driver's license data 109. Therefore, the account application 113 may determine whether the user in the captured image matches a user depicted in the driver's license data 109. Embodiments are not limited in these contexts.

Figure 7:
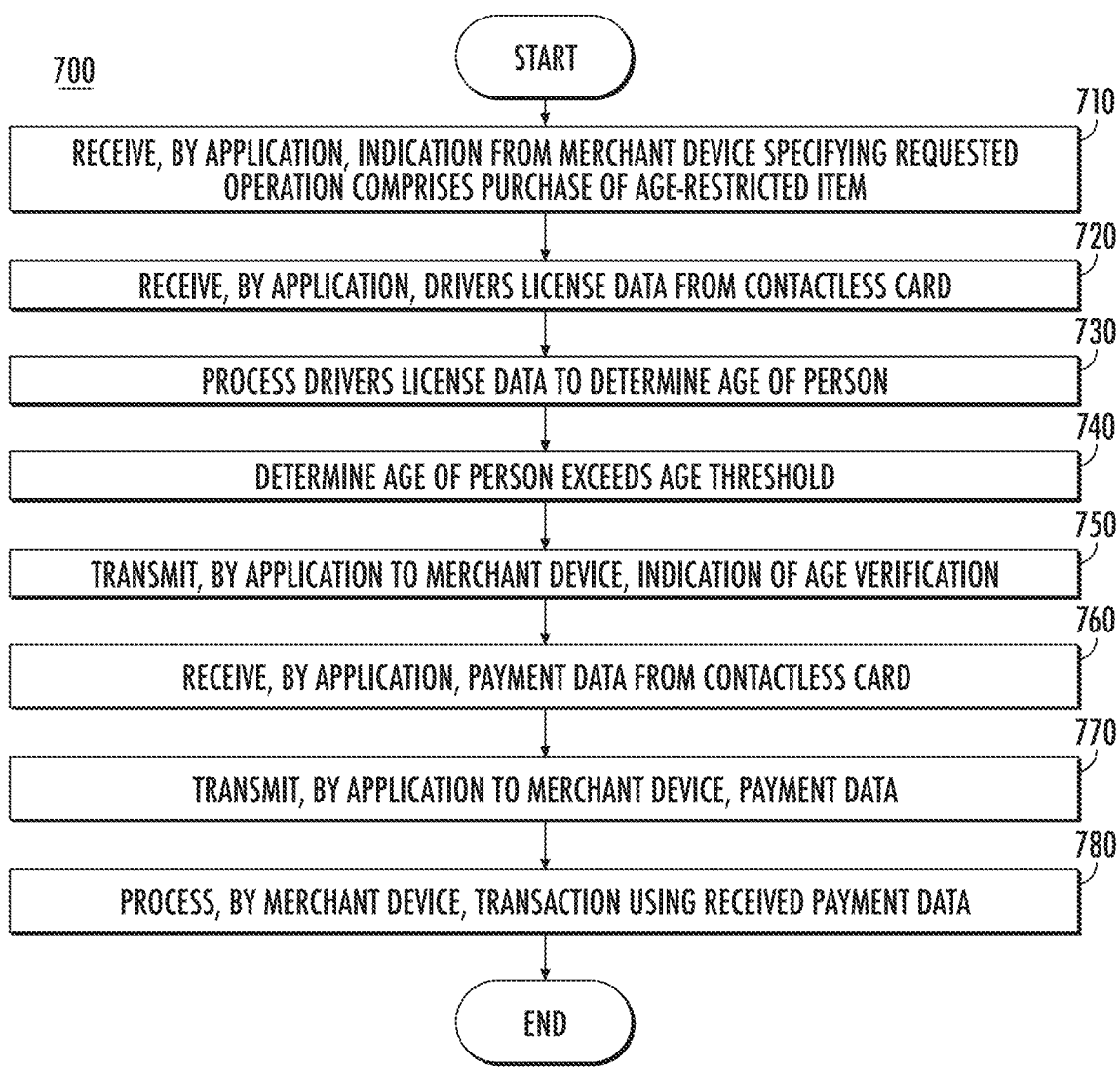
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to provide authentication based on the driver's license data 109 stored in the contactless card 101. Embodiments are not limited in this context.

As shown, the logic flow 700 begins at block 710, where the account application 113 receives an indication from a merchant device 301 specifying that age verification is required to purchase an age-restricted item. At block 720, the account application 113 receives the driver's license data 109 from the contactless card 101 based on a tap of the card 101 to the mobile device 110. At block 730, the account application 113 processes the driver's license data 109 to determine the age of the associated person, e.g., based on a date of birth included in the driver's license data.

At block 740, the account application 113 determines that the age of the person determined at block 730 exceeds a minimum age threshold. At block 750, the account application 113 transmits an indication that the person's age exceeds the threshold. Additionally and/or alternatively, the account application 113 may transmit the age and/or the driver's license data 109 to the merchant device 301 for processing and verification. At block 760, the account application 113 receives payment data from the contactless card 101 responsive to a tap of the contactless card 101 to the mobile device 110. At block 770, the account application 113 transmits the payment data to the merchant device 301. At block 780, the merchant device 301 may process the transaction using the received payment data. In some embodiments, the merchant device 301 transmits a payment confirmation to the account application 113.

Figure 8:
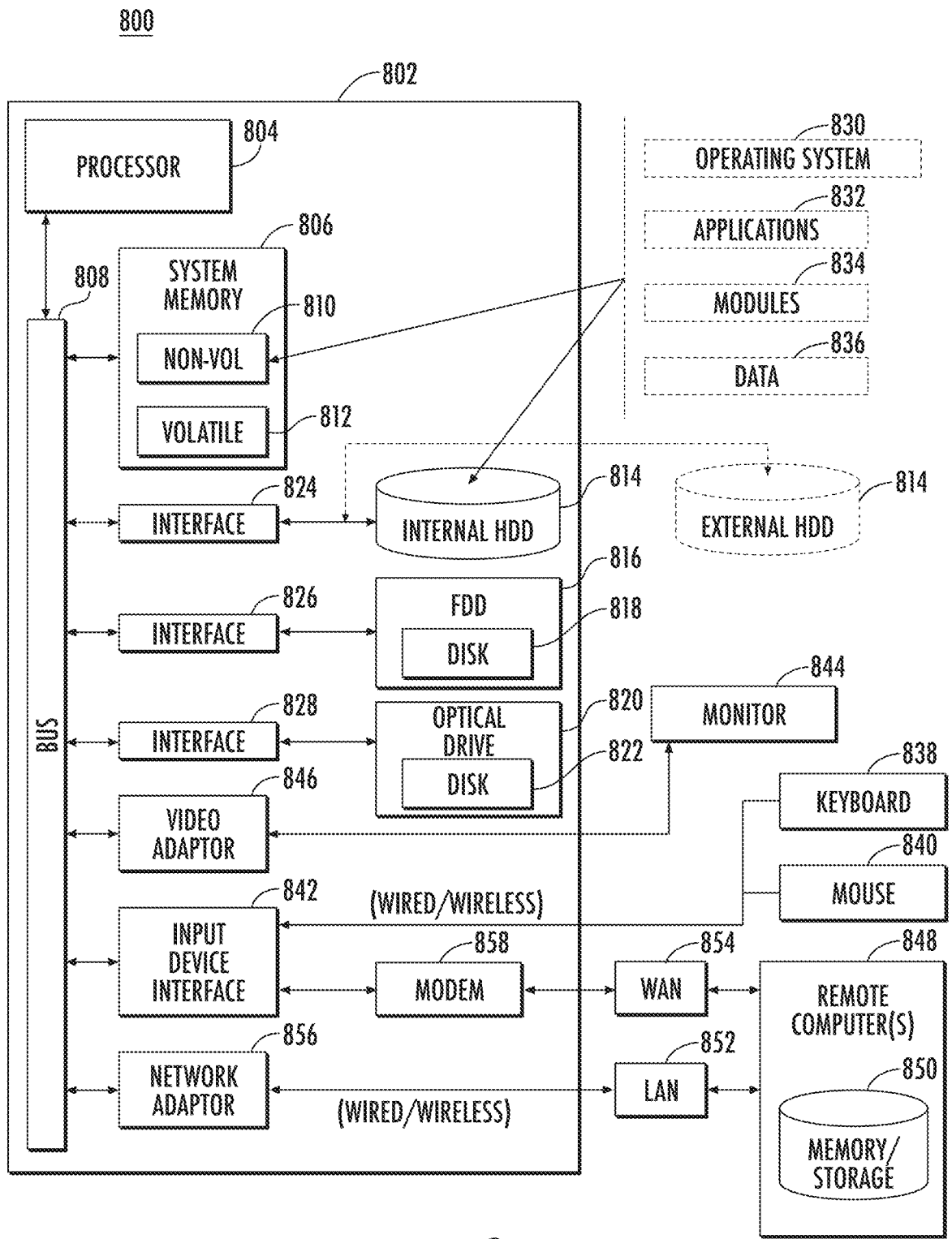
FIG. 8 illustrates an embodiment of a computing system.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the contactless card 101, mobile devices 110, and authentication server 120 of the system 100. The embodiments are not limited in this context. More generally, the computing architecture 800 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the applet 103, counter 104, master key 105, diversified key 106, customer ID 107, passport data 108, driver's license data 109, other user data 131, encrypted customer ID 132, operating system 112, account application 113, other applications 114, the authentication application 123, and/or the account data 124.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A system, comprising:
    a processor;
    and a memory storing an application and instructions which when executed by the processor cause the processor to perform the steps of:
    receiving, via the application, a request to perform an operation associated with an account;
    receiving, via the application, encrypted data from a contactless card associated with the account;
    transmitting, via the application to an authentication server, the encrypted data received from the contactless card;
    receiving, via the application from the authentication server, a decryption result;
    determining, via the application based on the decryption result, that the authentication server decrypted the encrypted data;
    determining, via the application, a type of authentication data required to authorize the operation;
    receiving, via the application based on the determined type of authentication data, an encrypted first data element from the contactless card, the first data element comprising a passport image or a driver license image;
    transmitting, via the application, the encrypted first data element to the authentication server;
    receiving, via the application, the first data element from the authentication server;
    determining, via the application, that the received first data element satisfies at least one rule for authorizing the operation;
    authorizing performance of the operation via the application based on the received decryption result and the determination that the received first data element satisfies the at least one rule for authorizing the operation; and
    performing the operation via the application, wherein the operation comprises one or more of: (i) viewing attributes of the account, (ii) modifying the attributes of the account, (iii) accessing a page of the application, or (iv) processing a transaction using the contactless card.

2. The system of claim 1, the memory storing instructions which when executed by the processor cause the processor to perform the steps of:
    receiving, via the application from the contactless card, a digital signature of the first data element;
    verifying, via the application, the digital signature; and
    determining, via the application, the type of authentication data based on a type of the operation.

3. The system of claim 2, the memory storing instructions which when executed by the processor cause the processor to perform the steps of:
    receiving, via the application, a first image of a person;
    comparing, via the application, the first image to the passport image; and
    determining, via the application based on the comparison, that a similarity of a person in the passport image and the person in the first image exceeds a similarity threshold, wherein the determination the passport image or the driver license image satisfies the at least one rule is based on the similarity of the person in the passport image and the person in the first image exceeding the similarity threshold.

4. The system of claim 3, further comprising an image capture device and the memory storing instructions which when executed by the processor cause the processor to perform the steps of:
    outputting, via the application, a notification to provide the first image; and
    capturing the first image via the image capture device.

5. The system of claim 4, the memory storing instructions which when executed by the processor cause the processor to:
    receiving, via the application, authentication credentials associated with the account, the authentication credentials comprising one or more of a login, a password, or biometric credentials; and
    determining, via the application based on the similarity of the person in the passport image and the person in the first image exceeding the similarity threshold, that the person in the first image matches the person in the passport image.

6. The system of claim 2, the memory storing instructions which when executed by the processor cause the processor to perform the steps of:
    receiving, via the application, a first version of the passport image or the driver license image; and transmitting, via the application to the contactless card, the first version of the passport image or the driver license image.

7. A non-transitory computer-readable storage medium having computer-readable program code embodied therewith, the computer-readable program code, when executed by a processor of a device comprising an image capture device, causes the processor to perform the steps of:
   executing an application;
   receiving, via the application, a request to perform an operation associated with an account;
   receiving, via the application, encrypted data from a contactless card associated with the account;
   transmitting, via the application to an authentication server, the encrypted data received from the contactless card;
   receiving, via the application from the authentication server, a decryption result,
   determining, via the application based on the decryption result, that the authentication server decrypted the encrypted data;
   determining, via the application, a type of authentication data required to authorize the operation;
   receiving, via the application based on the determined type of authentication data, an encrypted first data element from the contactless card, the first data element comprising a passport image or a driver license image;
   transmitting, via the application, the encrypted first data element to the authentication server;
   receiving, via the application, the first data element from the authentication server;
   determining, via the application, that the received first data element satisfies at least one rule for authorizing the operation;
   authorizing, via the application, performance of the operation based on the received decryption result that the authentication server decrypted the encrypted data and the determination that the received first data element satisfies the at least one rule for authorizing the operation; and
   performing the operation via the application, wherein the operation comprises one or more of: (i) viewing attributes of the account, (ii) modifying the attributes of the account, (iii) accessing a page of the application, or (iv) processing a transaction using the contactless card.

8. The non-transitory computer-readable storage medium of claim 7, further comprising computer-readable program code executable by the processor to cause the processor to perform the steps of:
   receiving, via the application from the contactless card, a digital signature of the first data element;
   verifying, via the application, the digital signature; and
   determining, via the application, the type of authentication data based on a type of the operation.

9. The non-transitory computer-readable storage medium of claim 8, comprising computer-readable program code executable by the processor to cause the processor to perform the steps of:
   receiving, via the application, a first image of a person;
   comparing, via the application, the first image to the passport image; and
   determining, via the application based on the comparison, that a similarity of a person in the passport image and the person in the first image exceeds a similarity threshold, wherein the determination the passport image or the driver license image satisfies the at least one rule is based on the similarity of the person in the passport image and the person in the first image exceeding the similarity threshold.

10. The non-transitory computer-readable storage medium of claim 9, further comprising computer-readable program code executable by the processor to cause the processor to perform the steps of:
    outputting, via the application, a notification to provide the first image; and
    capturing the first image via the image capture device.

11. The non-transitory computer-readable storage medium of claim 10, further comprising computer-readable program code executable by the processor to cause the processor to perform the steps of:
    receiving, via the application, authentication credentials associated with the account, the authentication credentials comprising one or more of a login, a password, or biometric credentials; and
    determining, via the application based on the similarity of the person in the passport image and the person in the first image exceeding the similarity threshold, that the person in the first image matches the person in the passport image.

12. The non-transitory computer-readable storage medium of claim 8, further comprising computer-readable program code executable by the processor to cause the processor to perform the steps of:
    receiving, via the application, a first version of the passport image or the driver license image; and
    transmitting, via the application to the contactless card, the first version of the passport image or the driver license image for storage.

13. A method performed by a device comprising a processor, an application and an image capture device, the method comprising:
    executing, by the processor, the application;
    receiving, by the application, a request to perform an operation associated with an account;
    receiving, by the application, encrypted data from a contactless card associated with the account;
    transmitting, by the application to an authentication server, the encrypted data received from the contactless card;
    receiving, by the application from the authentication server, a decryption result;
    determining, by the application based on the decryption result, that the authentication server decrypted the encrypted data;
    determining, by the application, a type of authentication data required to authorize the operation;
    receiving, by the application based on the determined type of authentication data, an encrypted first data element from the contactless card, the first data element comprising a passport image or a driver license image;
    transmitting, by the application, the encrypted first data element to the authentication server;
    receiving, by the application, the first data element from the authentication server;
    determining, by the application, that the received first data element satisfies at least one rule for authorizing the operation;
    authorizing performance of the operation by the application based on the received decryption result and the determination that the received first data element satisfies the at least one rule for authorizing the operation; and
    performing the operation by the application, wherein the operation comprises one or more of: (i) viewing attributes of the account, (ii) modifying the attributes of the account, (iii) accessing a page of the application, or (iv) processing a transaction using the contactless card.

14. The method of claim 13, further comprising:
receiving, by the application from the contactless card, a digital signature of the first data element;
verifying, by the application, the digital signature; and
determining, by the application, the type of authentication data based on a type of the operation.

15. The method of claim 14, further comprising:
outputting, by the application, a notification to provide an image;
capturing, by the application, a first image of a person via the image capture device;
receiving, by the application, the first image;
comparing, by the application, the first image to the passport image; and
determining, by the application based on the comparison, that a similarity of a person in the passport image and the person in the first image exceeds a similarity threshold, wherein the determination the first passport image or the driver license image satisfies the at least one rule is based on the similarity of the person in the passport image and the person in the first image exceeding the similarity threshold.

16. The method of claim 15, further comprising: receiving, by the application, authentication credentials associated with the account, the authentication credentials comprising one or more of a login, a password, or biometric credentials; and
determining, by the application based on the similarity of the person in the passport image and the person in the first image exceeding the similarity threshold, that the person in the first image matches the person in the passport image.

17. The method of claim 14, further comprising:
receiving, by the application, a first version of the passport image or the driver license image;
transmitting, by the application to the contactless card, the first version of the passport image or the driver license image.

* * * * *

UNITED STATES PATENT AND TRADEMARK OFFICE
CERTIFICATE OF CORRECTION

PATENT NO. : 10,853,795 B1
APPLICATION NO. : 16/726385
DATED : December 1, 2020
INVENTOR(S) : Nicholas Capurso, Samuel Edwards and Jason Pribble It is certified that error appears in the above-identified patent and that said Letters Patent is hereby corrected as shown below:

In the Claims

Column 23, Claim 15, Line 21; Please replace "wherein the determination the first passport" with --wherein the determination the passport--

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*